US012000282B1

(12) United States Patent
Johnson

(10) Patent No.: US 12,000,282 B1
(45) Date of Patent: Jun. 4, 2024

(54) SYSTEMS AND METHODS FOR MICROWAVE-BASED DRILLING EMPLOYING COILED TUBING WAVEGUIDE

(71) Applicant: Schlumberger Technology Corporation, Sugar Land, TX (US)

(72) Inventor: Ashley Bernard Johnson, Milton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/305,790

(22) Filed: Apr. 24, 2023

(51) Int. Cl.
*E21B 7/15* (2006.01)
*H05B 6/70* (2006.01)
*H05B 6/80* (2006.01)

(52) U.S. Cl.
CPC ................. *E21B 7/15* (2013.01); *H05B 6/70* (2013.01); *H05B 6/80* (2013.01); *H05B 2206/04* (2013.01)

(58) Field of Classification Search
CPC .... E21B 7/15; H05B 6/64; H05B 6/70; H05B 6/80; H05B 2206/04
See application file for complete search history.

(56) References Cited

U.S. PATENT DOCUMENTS 8,393,410 B2 * 3/2013 Woskov .................... E21B 7/14 175/11
9,453,373 B2 * 9/2016 Shnell ...................... H05B 6/80
11,028,648 B1 * 6/2021 Araque ................... E21B 47/07
11,060,400 B1 * 7/2021 Jamison ............... G01N 29/022
2003/0034777 A1 * 2/2003 Chen ........................ G01V 3/32 702/6
2009/0260818 A1 * 10/2009 Daniel .................. E21B 21/003 166/57
2009/0321132 A1 * 12/2009 Ouellet ..................... E21B 7/15 175/11
2012/0012319 A1 * 1/2012 Dennis ................ E21B 43/2401 166/66.5
2012/0068086 A1 * 3/2012 DeWitt ................... E21B 37/00 250/492.1
2014/0151045 A1 * 6/2014 Galey ..................... E21B 33/13 166/288
2015/0176333 A1 * 6/2015 Hanback ................... E21B 7/15 175/16
2016/0334343 A1 * 11/2016 Hurlimann ............ E21B 49/082
2019/0051962 A1 * 2/2019 Samson ..................... H01P 3/20
2020/0290892 A1 * 9/2020 Al-Mulhem ............. C09K 8/58
2022/0186582 A1 * 6/2022 Quero ................... E21B 21/082
2022/0364439 A1 * 11/2022 Al-Huwaider .......... E21B 36/00
2023/0008455 A1 * 1/2023 Phan ......................... E21B 7/15

OTHER PUBLICATIONS

Quaise Energy, "Unlocking the true power of clean geothermal energy" from https://www.quaise.energy, 2003, 14 pages.

* cited by examiner

*Primary Examiner* — Shane Bomar
(74) *Attorney, Agent, or Firm* — Jeffrey D. Frantz

(57) ABSTRACT

Microwave-based drilling systems and methods are provided that employ coiled tubing that is deployed from a spool of coiled tubing to guide propagation of microwave radiation into a borehole. The coiled tubing has a surface end disposed at the spool. Microwave radiation generated at the surface is injected into the surface end of the coiled tubing. The microwave radiation propagates inside the coiled tubing and is used to vaporize rock and extend the borehole.

24 Claims, 4 Drawing Sheets

SYSTEMS AND METHODS FOR MICROWAVE-BASED DRILLING EMPLOYING COILED TUBING WAVEGUIDE

FIELD

The subject disclosure relates to systems and methods for drilling a borehole in a subterranean formation that use microwave radiation.

BACKGROUND

There are a number of proposals that use microwave radiation to drill a borehole in a subterranean formation. Many proposals generate electromagnetic waves in a downhole tool. One option being developed employs a gyrotron to generate microwave radiation at the surface and guides the microwave radiation downhole through drill pipe with compressed argon as the drilling fluid. The use of drill pipe as a waveguide for the microwave radiation is problematic as discontinuities and changes in conductivity can form in the joints of the drill pipe, which can result in energy loss and possible high voltage arcing. Furthermore, the injection of the microwave radiation and argon into the drill pipe cannot be performed as part of a continuous process because the drill pipe waveguide is disrupted as new drill pipe sections are added to the waveguide during the drilling process. These issues can limit the efficiency and effectiveness of the system.

SUMMARY

In embodiments, microwave-based drilling systems and methods are provided that employ coiled tubing that is deployed from a spool of coiled tubing to guide propagation of microwave radiation into a borehole. The coiled tubing has a surface end disposed at the spool. A coupler injects microwave radiation generated by a microwave generator into the surface end of the coiled tubing. The microwave radiation propagates inside the coiled tubing and is used to vaporize rock and extend the borehole.

In embodiments, the coupler can be further configured to inject a pressurized fluid into the surface end of the coiled tubing. The pressurized fluid can flow through the coiled tubing and act as a transparent medium for propagation of microwave radiation inside the coiled tubing. Additionally or alternatively, the pressurized fluid can flow through the coiled tubing and act as a purge fluid to keep the inside of the coiled tubing free of unwanted matter. Such unwanted matter can include dust or rock particles or other solids as well as moisture or other fluid residue that result from the microwave heating of the formation.

In embodiments, the pressurized fluid can be an inert gas, such as argon.

In embodiments, the system can further include a waveguide operably coupled between the microwave generator and the coupler. An injection manifold that has multiple legs can supply the pressurized fluid to the waveguide through corresponding ports in the waveguide.

In embodiments, the coiled tubing can be a continuous length of small-diameter steel pipe coiled on the spool and deployed from the spool in a continuous length.

In embodiments, the coiled tubing can have a continuous inner diameter surface having a diameter greater than two times the characteristic wavelength of the microwave radiation injected into the surface end of the coiled tubing.

In embodiments, the coiled tubing can have an inner diameter surface that is cleaned and flushed with solvents.

In embodiments, the coiled tubing can be purged with an inert gas when not in use in order to avoid the possibility of surface damage or corrosion.

In embodiments, the microwave generator can be a magnetron or gyrotron.

In embodiments, the coupler can be a swivel coupler.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
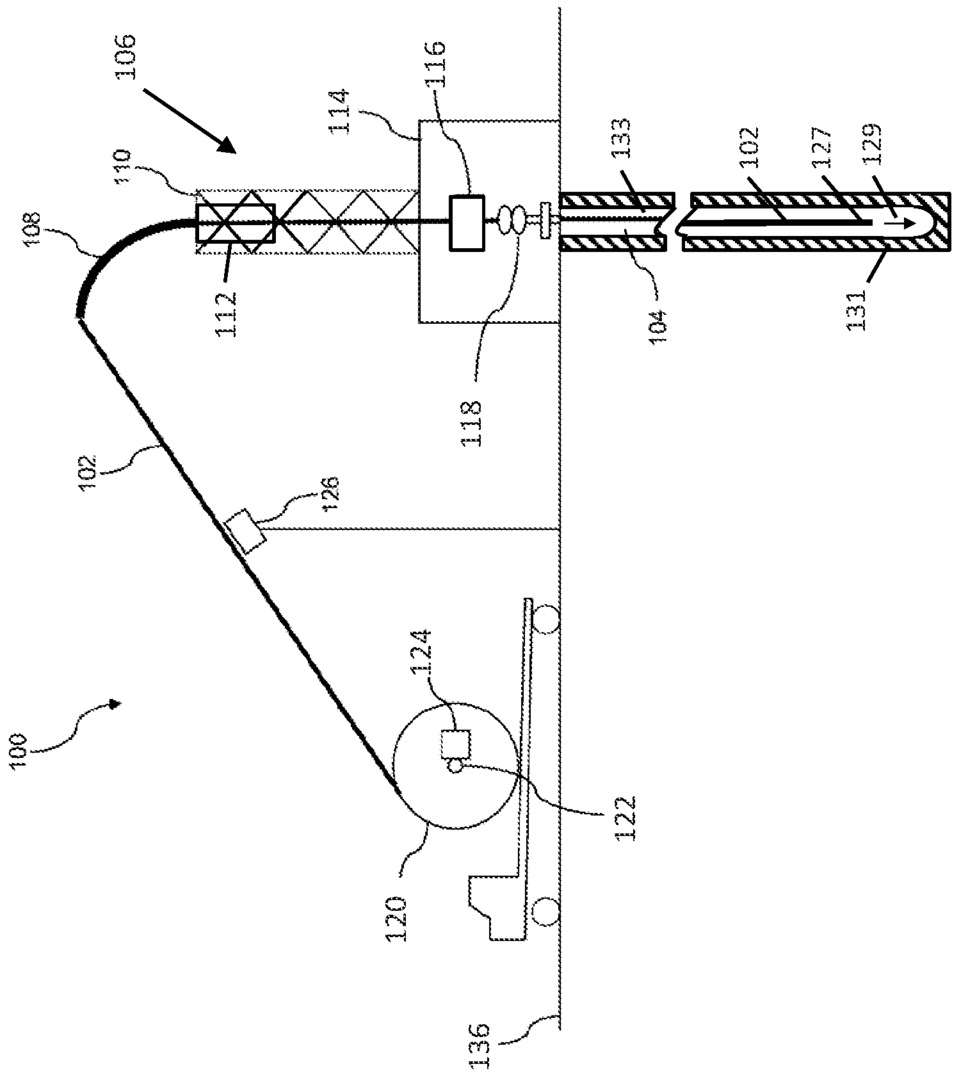
FIG. 1 is a schematic block diagram that depicts a microwave-based drilling system in accordance with an embodiment of the subject disclosure.

Turning now to FIG. 1, a system 100 for forming a borehole in a subterranean rock formation is described. The system 100 includes coiled tubing 102 that is supported and moved into and out of the borehole 104 being formed by an injector 106 disposed at the surface 136. The injector 106 includes gooseneck 108, mast 110, a hydraulically-driven injector head 112, and substructure 114. The coiled tubing 102 may be fed through equipment at the surface 136. The equipment can include a stripper assembly 116 that provides a dynamic seal around the coiled tubing 102 as well as a blowout preventer (BOP) and a completion christmas tree (collectively labeled 118) as is well known.

The coiled tubing 102 is deployed from a coiled tubing spool 120 that is rotatably driven about an axle 122 by motor 124 to pay out the coiled tubing 102 from the spool 120 when the coiled tubing 102 is injected into the borehole 104 and to take up the coiled tubing 102 onto the spool 120 when the coiled tubing 104 is ejected in the reverse direction out of the borehole 104.

In embodiments, the coiled tubing can be a continuous length of small-diameter steel pipe coiled on the spool 120 and deployed from the spool 120 in a continuous length, thus precluding any need for making or breaking connections between joints. This permits a continuous length of tubing to run in or out of the borehole 104 as it is being formed. Coiled tubing is commonly available in diameters of 0.75 to 4.5 inches and can range in length from 2,000 to more than 30,000 ft. A depth measuring system 126 can be used for accurate depth measurements of the coiled tubing at the wellsite.

In the system of FIG. 1, the internal passageway of the coiled tubing 102 is used to guide microwave radiation from the surface to a downhole end 127 of the coiled tubing 102 disposed in the borehole 104 and also supply pressurized fluid (such as an inert gas) from the surface 136 to the downhole end 127. The microwave radiation exits the open downhole end 127 of the coiled tubing (illustrated by arrow 129) and vaporizes the formation (rock) 131 in the local vicinity of the downhole end 127 to make a path through the formation 131 and thus extend the borehole 104. The pressurized fluid can flow inside the coiled tubing 102 and exit the open downhole end 127. The pressurized fluid can function as a transparent medium for propagation of the microwave radiation inside the coiled tubing 102 and as purge fluid to keep the inside of the coiled tubing 102 free of unwanted matter, such as dust or rock particles or other solids as well as moisture or other fluid residue that result from the microwave heating of the rock formation in the near borehole region in the local vicinity of the downhole end 127. The pressure of the pressurized fluid in the local vicinity of the downhole end 127 can be controlled to assist in the vaporization (thermal melting) of the formation (rock) 131 that forms the borehole 104. The pressurized fluid (e.g., gas) can convect any solid material which remains after the vaporization away from the bottom of the well. It will also convect other gas and liquid phases away from the bottom well. Furthermore, it can prevent any contamination of foreign material into the coiled tubing where it could disrupt the waveguide for the microwave radiation. In embodiments, the downhole end 127 can include a bottomhole assembly (BHA) with a central bore that is coaxial to the interior passageway of the coiled tubing 102 to allow the microwave radiation and pressured fluid supplied by the coiled tubing 102 to exit from the downhole end 127.

The pressurized fluid that exits the open downhole end 127 can also mix with volatilized out gassing of the rock material and other borehole material and carry the vapor and fine particulate matter to the surface 136 through the annular space 133 between the borehole wall and the coiled tubing 102, leaving behind a glassy, ceramic-like borehole wall. This borehole wall can act as a dielectric waveguide to transmit microwave radiation that exits the open downhole end 127 to a depth that vaporizes the formation (rock) 131.

The depth of the open downhole end 127 of the coiled tubing 102 can be lowered or otherwise adjusted in the borehole 104 as the borehole is formed to extend the depth of the borehole into the formation 131.

In embodiments, the pressurized fluid can be an inert gas, such as argon. The pressurized fluid could also be nitrogen or air which had been dried and de-oxygenated. Removing the oxygen is important to prevent corrosion or combustion in the coiled tubing or in the well.

In embodiments, the coiled tubing 102 can have an inner diameter surface that provides a continuous conduit having a singular annular profile that mitigates issues with surface discontinuities that can cause high voltage arcing as well as losses in the transmission efficiency of the microwave radiation. The inner diameter surface of the coiled tubing 102 can be cleaned and flushed with solvents to remove corrosion or traces of hydrocarbons. Furthermore, the coiled tubing 102 can be purged with an inert gas when not in use in order to avoid the possibility of surface damage or corrosion.

In embodiments, the inner diameter surface of the coiled tubing 102 can have a diameter greater than two times the characteristic wavelength of the microwave radiation injected into the coiled tubing 102 at the surface 136. This characteristic wavelength can be dictated by the type and design of the microwave generator that generates the microwave radiation that is injected into the coiled tubing 102 at the surface 136.

During the microwave-based drilling operations that form the borehole, there will be no requirement to stop the supply of microwave radiation from the surface 136 to the open borehole end 127 of the coiled tubing 102, which simplifies the drilling operation, removes the need to vent the system and improves the integrity of the drilling operation.

Figure 2:
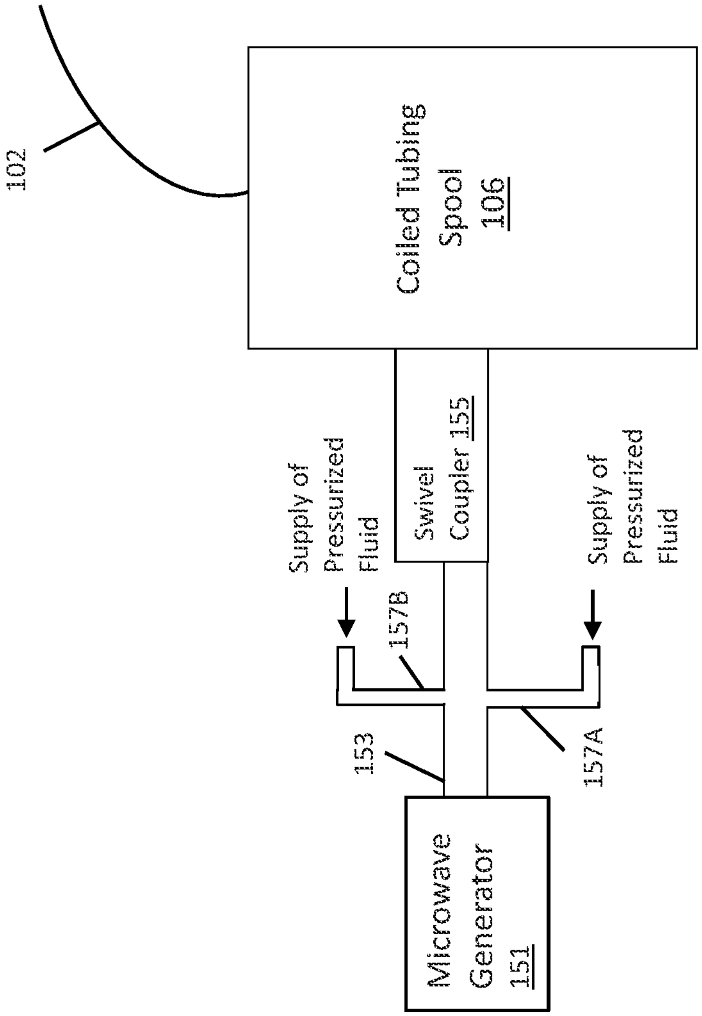
FIG. 2 is a schematic diagram that depicts components of the system of FIG. 1 that generate and supply microwave radiation as well as pressurized fluid to the coiled tubing at the surface.

FIG. 2 is a schematic illustration of components of the system of FIG. 1 that generate and supply the microwave radiation as well as pressurized fluid to the coiled tubing 102 at the surface 136. More specifically, a microwave generator 151 is configured to generate microwave radiation and output the microwave radiation via a waveguide 153 to a swivel coupler 155 disposed at or near the rotational axis 122 of the coiled tubing spool 120. The swivel coupler 155 includes first and second parts that are coupled together via slip rings (not shown). The first part is rigidly coupled to waveguide 153 in a fixed orientation. The second part is rigidly coupled to the surface end of the coiled tubing 102 located at or near the rotational axis 122 of the coiled tubing spool 120. The slip rings allow the second part of the swivel coupler 155 (and the coiled tubing and spool 120 coupled thereto) to rotate relative to the first part (and waveguide 153 coupled thereto) during rotation of the spool 120 that pays out the coiled tubing 102 from the spool 120 or takes up the coiled tubing 102 onto the spool 120. The waveguide 153 also includes opposed ports that are fluidly coupled to corresponding legs 157A, 157B of a fluid injection manifold that supplies the pressurized fluid to the waveguide 153. The swivel coupler 155 functions as i) a waveguide for the microwave radiation produced by the generator 151 and supplied by the waveguide 153 for injection into the surface end of the coiled tubing 102 and ii) as a fluid coupler that supplies pressurized fluid from the waveguide 153 to the surface end of the coiled tubing 102. In this manner, the swivel coupler 155 is configured to inject both microwave radiation and pressurized fluid into the surface end of the coiled tubing 102 and such microwave radiation is transmitted through the internal passageway of the coiled tubing 102 together with a flow of pressurized fluid to the downhole end of the coiled tubing 102 for forming the borehole as described herein. In this embodiment, the microwave generator 151 and the fluid injection manifold are disposed outside the spool such that the microwave generator and the fluid injection manifold do not rotate with the spool 120.

Figure 3:
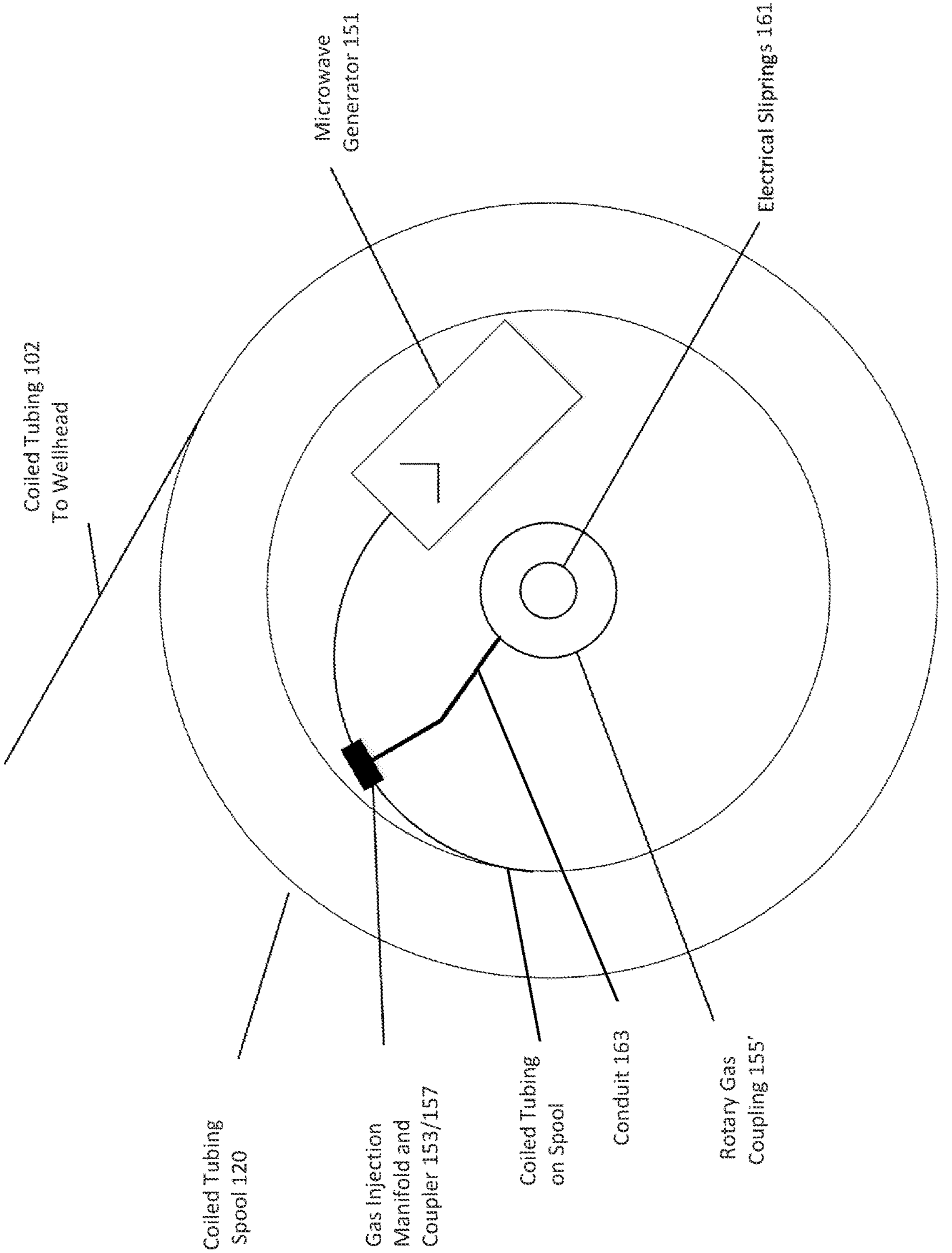
FIG. 3 is a schematic diagram of an alternate embodiment of components of the system of FIG. 1 that generate and supply microwave radiation as well as pressurized fluid to the coiled tubing at the surface.

In an alternative embodiment shown in FIG. 3, the microwave generator 151 and a gas injection manifold and coupler 153/157 can be disposed inside the frame of the coiled tubing spool 120 such that the microwave generator 151 as well as the gas injection manifold and coupler 153/157 rotates with the coiled tubing spool 120. The power and control for the microwave generator 151 can be provided by external surface-located components that are operably coupled to the microwave generator 151 via electrical slip rings 161. The pressurized fluid can be supplied to the coiled tubing spool 120 via a standard rotary coupler 155' disposed at or near the rotational axis 122 of the coiled tubing spool 120. The coupler 155' is fluidly coupled to the gas injection manifold and coupler 153/157 by a conduit 163 disposed inside the frame of the coiled tubing spool 120 such that the conduit 163 rotates with the coiled tubing spool 120. In this embodiment, the microwave generator 151 is configured to generate microwave radiation and output the microwave radiation to the gas injection manifold and coupler 153/157. The outlet of the gas injection manifold and coupler 153/157 is operably coupled to the surface end of the coiled tubing 102 on the spool 120. The rotary coupler 155' includes first and second parts that are coupled together via slip rings (not shown). The first part is rigidly coupled to tubing that supplies the pressurized fluid. The second part is rigidly coupled to conduit 163. The slip rings allow the second part of the rotary coupler 155' (and the gas injection manifold and coupler 153/157 and tubing spool 120 coupled thereto) to rotate relative to the first part during rotation of the spool 120 that pays out the coiled tubing 102 from the spool 120 or takes up the coiled tubing 102 onto the spool 120. The gas injection manifold and coupler 153/157 includes one or more ports that are fluidly coupled to conduit 163 that supplies pressurized fluid thereto. In this embodiment, the microwave generator 151 and the gas injection manifold and coupler 153/157 are disposed inside the spool such that the microwave generator 151 and the gas injection manifold and coupler 153/157 rotate with the spool 120. The gas injection manifold and coupler 153/157 functions as i) a waveguide for the microwave radiation produced by the generator 151 for injection into the surface end of the coiled tubing 102 and ii) as a fluid coupler that supplies pressurized fluid from the conduit 163 to the surface end of the coiled tubing 102. In this manner, the gas injection manifold and coupler 153/157 is configured to inject both microwave radiation and pressurized fluid into the surface end of the coiled tubing 102 and such microwave radiation is transmitted through the internal passageway of the coiled tubing 102 together with a flow of pressurized fluid to the downhole end of the coiled tubing 102 for forming the borehole as described herein.

The waveguide 153 can employ a rectangular cross section, a circular cross section or other suitable geometry.

The microwave generator 151 can be realized by a variety of different microwave generators. Microwave radiation is a form of electromagnetic radiation with wavelengths ranging from about one meter to one millimeter corresponding to frequencies between 300 MHz and 300 GHz respectively.

For example, the microwave generator 151 can be a magnetron. Magnetron can operate at power levels exceeding 100 KW of continuous-wave RF output and achieve high reliability. Magnetrons include a heated cylindrical cathode at a high (continuous or pulsed) negative potential created by a high-voltage, direct-current power supply. The cathode is placed in the center of an evacuated, lobed, circular metal chamber. The walls of the chamber are the anode of the tube. A magnetic field parallel to the axis of the cavity is imposed by a permanent magnet. The electrons initially move radially outward from the cathode attracted by the electric field of the anode walls. The magnetic field causes the electrons to spiral outward in a circular path, a consequence of the Lorentz force. Spaced around the rim of the chamber are cylindrical cavities. Slots are cut along the length of the cavities that open into the central, common cavity space. As electrons sweep past these slots, they induce a high-frequency radio field in each resonant cavity, which in turn causes the electrons to bunch into groups. A portion of the microwave radiation is extracted by a short coupling loop that is connected to a waveguide. In the system of the present disclosure, the waveguide 153 carries the extracted microwave radiation for delivery to the coiled tubing 102, which functions as a waveguide that guides the microwave radiation from the surface through the wellhead and downhole for forming the borehole.

In another example, the microwave generator 151 can be a gyrotron. The gyrotron is a type of free-electron maser that generates high-frequency electromagnetic radiation by stimulated cyclotron resonance of electrons moving through a strong magnetic field. It produces high power RF energy at millimeter wavelengths because as a fast-wave device its dimensions can be much larger than the wavelength of the radiation. This is unlike magnetrons, in which the wavelength is determined by a single-mode resonant cavity, a slow-wave structure. Thus, as operating frequencies increase, the resonant cavity structures must decrease in size, which limits the power output of the magnetron. The microwave radiation produced by the gyrotron is output to a waveguide. In the system of the present disclosure, the waveguide 153 carries the microwave radiation for delivery to the coiled tubing 102, which functions as a waveguide that guides the microwave radiation from the surface through the wellhead and downhole for forming the borehole.

In other embodiments, another suitable microwave generator can be used.

In embodiments, the waveguide 153 can include an isolator (not shown) that is configured to prevent reflected microwave radiation from returning to the microwave generator 151. The waveguide 153 can also include an interface (not shown) for diagnostic access and testing.

Figure 4:
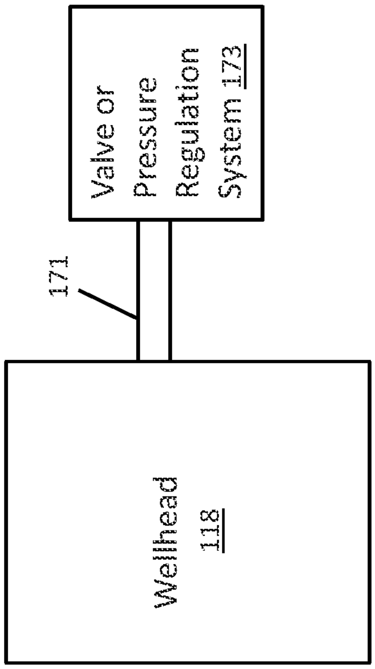
FIG. 4 is a schematic illustration of components of the system of FIG. 1 that regulate the pressure of fluid that carries rock vapor and fine rock particulates to the surface through the annular space between the borehole wall and the coiled tubing.

FIG. 4 is a schematic illustration of components of the system of FIG. 1 that regulate the pressure of the fluid that carries the rock vapor and fine rock particulates to the surface 136 through the annular space 133 between the borehole wall and the coiled tubing 102. Specifically, the rock vapor and fine rock particles will flow with the pressurized fluid to the surface and exit through a side port or manifold of the wellhead 118. Tubing 171 can extend from such side port or manifold to a valve or pressure regulation system 173. The valve or pressure regulation system 173 can be configured to control the pressure of the pressurized fluid in the borehole 104 during drilling operations as desired. Additionally or alternatively, the valve or pressure regulation system 173 can be configured to allow for exhaust of volatilized rock and borehole material.

The microwave-based drilling system as described herein can be used by itself or in combination with conventional drilling. At a depth where the expense becomes prohibitory, conventional drilling could be discontinued and the microwave-based drilling system could be used to extend the well depth. This approach could be carried out by placing the coiled tubing inside the bore that was produced by conventional drilling.

Furthermore, the microwave-based drilling system as described herein can be used for horizontal drilling. When drilling vertically, the microwave radiation is directed downward by the downhole end of the coiled tubing. It can be possible to change the direction of the microwave radiation by incorporating a steerable system that changes the orientation of emission of the microwave radiation to drill horizontally or any other desired direction.

Advantageously, the microwave-based drilling system as described herein can provide for continuous drilling operations that eliminate non-productive times associated with venting and repressurizing drill pipe at each connection as would be needed for jointed drill pipe.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for drilling a borehole into a subsurface formation, comprising:

a spool of coiled tubing, wherein the coiled tubing has a surface end disposed at the spool, and wherein the coil tubing extends from the spool into the borehole;

a microwave generator; and a coupler for injecting microwave radiation generated by the microwave generator into the surface end of the coiled tubing, wherein the coiled tubing functions to guide propagation of the microwave radiation into the borehole, and wherein the coiled tubing has a continuous inner diameter surface having a diameter greater than two times the characteristic wavelength of the microwave radiation injected into the surface end of the coiled tubing.

2. The system of claim 1, wherein:

microwave radiation that propagates inside the coiled tubing is used to vaporize rock and extend the borehole into the formation.

3. The system of claim 1, wherein:

the coupler is further configured to inject a pressurized fluid into the surface end of the coiled tubing.

4. The system of claim 3, wherein:

the pressurized fluid flows through the coiled tubing and acts as a transparent medium for propagation of microwave radiation inside the coiled tubing.

5. The system of claim 3, wherein:

the pressurized fluid flows through the coiled tubing and acts as a purge fluid to keep the inside of the coiled tubing free of unwanted matter.

6. The system of claim 5, wherein:

the unwanted matter includes dust or rock particles or other solids as well as moisture or other fluid residue that result from the microwave radiation heating the formation.

7. The system of claim 3, wherein:

the pressurized fluid comprises an inert gas.

8. The system of claim 7, wherein:

the inert gas comprises argon.

9. The system of claim 1, wherein:

the microwave generator is disposed outside the spool such that the microwave generator does not rotate with the spool; or the microwave generator is disposed inside the spool such that the microwave generator rotates with the spool.

10. The system of claim 3, further comprising:

a waveguide operably coupled between the microwave generator and the coupler; and an injection manifold having multiple legs that supply the pressurized fluid to the waveguide through corresponding ports in the waveguide.

11. The system of claim 1, wherein:

the coiled tubing comprises a continuous length of small-diameter steel pipe coiled on the spool and deployed from the spool in a continuous length.

12. The system of claim 1, wherein:

the coiled tubing has an inner diameter surface that is cleaned and flushed with solvents.

13. The system of claim 1, wherein:

the coiled tubing is purged with an inert gas when not in use in order to avoid the possibility of surface damage or corrosion.

14. The system of claim 1, wherein:

the microwave generator comprises a magnetron, gyrotron, or other suitable microwave generator.

15. The system of claim 1, wherein:

the coupler comprises a swivel coupler.

16. A method for drilling a borehole into a subsurface formation, comprising:

deploying coiled tubing from a spool of coiled tubing such that the coiled tubing extends from the spool into the borehole, wherein the coiled tubing has a surface end disposed at the spool;

injecting, via a coupler, microwave radiation generated by a microwave generator into the surface end of the coiled tubing, wherein the coiled tubing functions to guide propagation of the microwave radiation into the borehole, and wherein the coiled tubing has a continuous inner diameter surface having a diameter greater than two times the characteristic wavelength of the microwave radiation injected into the surface end of the coiled tubing; and using microwave radiation that propagates inside the coiled tubing to vaporize rock and extend the borehole into the formation.

17. The method of claim 16, further comprising:

injecting a pressurized fluid into the surface end of the coiled tubing.

18. The method of claim 17, wherein:

the pressurized fluid flows through the coiled tubing and acts as a transparent medium for the propagation of the microwave radiation inside the coiled tubing.

19. The method of claim 17, wherein:

the pressurized fluid flows through the coiled tubing and acts as a purge fluid to keep the inside of the coiled tubing free of unwanted matter.

20. The method of claim 19, wherein:
the unwanted matter includes dust or rock particles or other solids as well as moisture or other fluid residue that result from the microwave radiation heating the formation.

21. The method of claim 17, wherein:
the pressurized fluid comprises an inert gas.

22. The method of claim 16, further comprising:
cleaning and flushing the coiled tubing with solvents.

23. The method of claim 16, further comprising:
purging the coiled tubing with an inert gas when not in use in order to avoid the possibility of surface damage or corrosion.

24. A system for drilling a borehole into a subsurface formation, comprising:
a spool of coiled tubing, wherein the coiled tubing has a surface end disposed at the spool, and wherein the coil tubing extends from the spool into the borehole;
a microwave generator;
a coupler for injecting microwave radiation generated by the microwave generator into the surface end of the coiled tubing, wherein the coiled tubing functions to guide propagation of the microwave radiation into the borehole, and wherein the coupler is further configured to inject a pressurized fluid into the surface end of the coiled tubing;
a waveguide operably coupled between the microwave generator and the coupler; and
an injection manifold having multiple legs that supply the pressurized fluid to the waveguide through corresponding ports in the waveguide.

* * * * *